US011681738B2

(12) United States Patent
Allison (10) Patent No.: US 11,681,738 B2
(45) Date of Patent: Jun. 20, 2023

(54) CREATIVE ARTS RECOMMENDATION SYSTEMS AND METHODS

(71) Applicant: Christopher John Allison, London (GB)

(72) Inventor: Christopher John Allison, London (GB)

( * ) Notice: Subject to any disclaimer, the term of this patent is extended or adjusted under 35 U.S.C. 154(b) by 1610 days.

(21) Appl. No.: 15/091,526

(22) Filed: Apr. 5, 2016

(65) Prior Publication Data

US 2016/0299914 A1 Oct. 13, 2016

Related U.S. Application Data (60) Provisional application No. 62/178,425, filed on Apr. 8, 2015.

(51) Int. Cl.
*G06F 16/435* (2019.01)
(52) U.S. Cl.
CPC .................. *G06F 16/435* (2019.01)
(58) Field of Classification Search
CPC .................. G06F 17/30029; G06F 16/435
USPC ........................................................ 707/769
See application file for complete search history.

(56) References Cited

U.S. PATENT DOCUMENTS

| 5,969,283 | A | * | 10/1999 | Looney | G10H 1/0041 84/478 |
| 7,982,629 | B2 | * | 7/2011 | Crowe | H04H 60/71 701/1 |
| 8,194,926 | B1 | * | 6/2012 | Keysers | G06F 3/0346 382/103 |
| 8,370,357 | B1 | * | 2/2013 | Gudmundsson | G11B 27/105 707/741 |
| 9,788,777 | B1 | * | 10/2017 | Knight | G06Q 30/0269 |
| 9,990,413 | B2 | * | 6/2018 | Jung | G06F 16/639 |

(Continued)

FOREIGN PATENT DOCUMENTS

WO    WO 2009/090358 A1 *   7/2009  ............ G06F 17/30

OTHER PUBLICATIONS

Kaminskas, Marius, et al., "Contextual music information retrieval and recommendation: State of the art and challenges", Computer Science Review, vol. 6, Issues 2-3, May 2012, pp. 89-119.*

(Continued)

*Primary Examiner* — Robert Stevens
(74) *Attorney, Agent, or Firm* — Thomas E. Lees, LLC (57) ABSTRACT

Users of electronic audio and video playback devices have become familiar with listening and viewing media from stored memory. Music may be listened to and any art may be viewed including television, motion pictures, still images and any other copyrightable works of audible or visual art, the types of which are vast. Traditional indexing criteria for such stored memory may include artist or author identification, track or work of art title, genre, era or origin, style of art, and other criteria pertaining to the work itself. According to the present invention, media elements stored in memory may now be characterized by entering criteria based on the qualitative attributes and emotive features ascertained upon playback or subsequent evaluation which are then associated with each stored audio, video, image or other file, for subsequent indexing, searching and recommendation operations.

14 Claims, 10 Drawing Sheets

(56) References Cited

U.S. PATENT DOCUMENTS

| | | | | |
|---|---|---|---|---|
| 2003/0023421 | A1* | 1/2003 | Finn | G10H 1/0008 707/E17.101 |
| 2003/0061201 | A1* | 3/2003 | Grefenstette | G06F 16/38 |
| 2009/0063975 | A1* | 3/2009 | Bull | G06F 16/68 707/999.005 |
| 2009/0240732 | A1* | 9/2009 | Amidon | G11B 27/329 707/E17.046 |
| 2010/0325126 | A1* | 12/2010 | Rajaram | G06Q 30/02 707/769 |
| 2011/0314377 | A1* | 12/2011 | Goodman | G06F 3/0482 715/716 |
| 2012/0072418 | A1* | 3/2012 | Svendsen | G06F 16/637 707/724 |
| 2013/0173533 | A1* | 7/2013 | Nichols | G06F 16/437 707/E17.005 |
| 2013/0332839 | A1* | 12/2013 | Frazier | H04N 21/4756 715/738 |
| 2014/0122465 | A1* | 5/2014 | Bilinski | G06F 16/635 707/723 |
| 2014/0154659 | A1* | 6/2014 | Otwell | G09B 5/02 434/365 |
| 2014/0164507 | A1* | 6/2014 | Tesch | H04L 51/10 709/204 |
| 2014/0188866 | A1* | 7/2014 | Wu | G06F 16/9535 707/732 |
| 2015/0178511 | A1* | 6/2015 | Klappert | G06F 21/6245 726/27 |
| 2015/0331940 | A1* | 11/2015 | Manning | G06F 16/639 707/740 |
| 2015/0356176 | A1* | 12/2015 | Bilinski | G06F 16/9535 707/740 |
| 2015/0379739 | A1* | 12/2015 | Dorner | G06T 11/001 345/600 |
| 2016/0162565 | A1* | 6/2016 | Jung | G06F 16/639 707/737 |
| 2016/0232625 | A1* | 8/2016 | Akutagawa | H04L 51/214 |
| 2016/0299914 | A1* | 10/2016 | Allison | G06F 16/435 |
| 2016/0323625 | A1* | 11/2016 | Casagrande | H04N 21/84 |
| 2016/0371372 | A1* | 12/2016 | Chong | H04H 60/65 |
| 2017/0024885 | A1* | 1/2017 | Miyazaki | A45D 44/005 |
| 2017/0148083 | A1* | 5/2017 | Yu | H04N 21/4756 |
| 2017/0270125 | A1* | 9/2017 | Mattsson | G06F 16/637 |
| 2018/0083901 | A1* | 3/2018 | McGregor, Jr. | H04L 51/10 |
| 2020/0125609 | A1* | 4/2020 | Cetintas | G06F 16/3331 |

OTHER PUBLICATIONS

Dunker, Peter, et al., "Content-based Mood Classification for Photos and Music", MIR '08, Vancouver, British Columbia, Canada, pp. 97-104.*

Han, Byeong-jun, et al., "Music emotion classification and context-based music recommendation", Multimedia Tools and Applications, vol. 47, Springer, © 2010, pp. 433-460.*

Ujlambkar, Arney, et al., "Mood Based Music Categorization System for Bollywood Music", International Journal of Advanced Computer Research, vol. 4, No. 1, Issue 14, Mar. 2014, pp. 223-230.*

Kim, Youngmoo E., et al., "Music Emotion Recognition: A State of the Art Review", ISMIR 2010, Utrecht, The Netherlands, Aug. 9-13, 2010, pp. 255-266.*

* cited by examiner

CREATIVE ARTS RECOMMENDATION SYSTEMS AND METHODS

This application is an original non-provisional patent application claiming the priority benefit of provisional patent application Ser. No. 62/178,425 filed Apr. 8, 2015, the contents of which are incorporated herein by reference.

FIELD

The following invention is generally concerned with making recommendations for people seeking items in the many fields of the creative arts. Some examples of items in the field of the creative arts including but not limited to, music, books, plays and other literature, sculpture, art in the traditional sense, video, film and television, music videos, still photography, furniture, interior design, architecture, podcasts, computer applications, video games, programs and software, live concerts, theater, ballet, opera, etc., photography and prints, fashion and clothing, etc.

PRIOR ART/BACKGROUND OF THE INVENTION

Current recommendation systems known to the art typically produce recommendations in one of two ways—through collaborative filtering or through content-based filtering. Collaborative filtering approaches building a model from a user's past behavior (e.g. items previously purchased) as well as similar decisions made by other users; then use that model to predict items that the user may have an interest in. Content-based filtering approaches utilize a series of discrete characteristics of an item in order to recommend additional items with similar properties. These approaches vary in complexity and are often combined into Hybrid Recommender Systems. These systems are of limited granularity and often fail to deliver truly meaningful and satisfactory recommendations.

SUMMARY OF THE INVENTION

Comes now, Christopher Allison with inventions of a Creative Arts Classification/Evaluation and Recommendation System that can greatly and more accurately assist in making recommendations utilizing the item's Key Qualitative Criteria and Key Emotive Features.

Via a proprietary algorithm and database the system presents the listener/viewer/user with recommendations that are neither narrow in genre or tribe but open up a veritable smorgasbord of higher quality recommendations that inspire.

Concurrently a listener/viewer/user profile is built up by the system which may be used as a modifier in future recommendations of either the same creative art or a creative art that the listener/viewer/user has yet to experience using the system. This includes modifiers that are not limited to; a listeners/viewers/users immediate and short-term preference patterns, medium to long term taste patterns and the situation and context of where they are listening/viewing/using and with whom.

OBJECTIVES OF THE INVENTION

It is a primary object of the invention to provide a Creative Arts Recommendation System based on an item's Key Qualitative Criteria and its Key Emotive Features.

It is an object of the invention to provide a matrix of Key Qualitative Criteria and Key Emotive Features to make recommendations.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

PREFERRED EMBODIMENT

The recommendation system described herein relies on the art of music for many of the examples in the preferred embodiment but is not limited solely to the field of music. It should be noted that the system can be used in almost any area of the creative arts including but not limited to, music, books, plays and other literature, sculpture, art in the traditional sense, video, film and television, music videos, still photography, furniture, interior design, architecture, podcasts, computer applications, video games, programs and software, live concerts, theater, ballet, opera, etc., photography and prints, fashion and clothing to name a few, to generate recommendations using the Key Qualitative Criteria & Key Emotive Features described herein.

Figure 1:
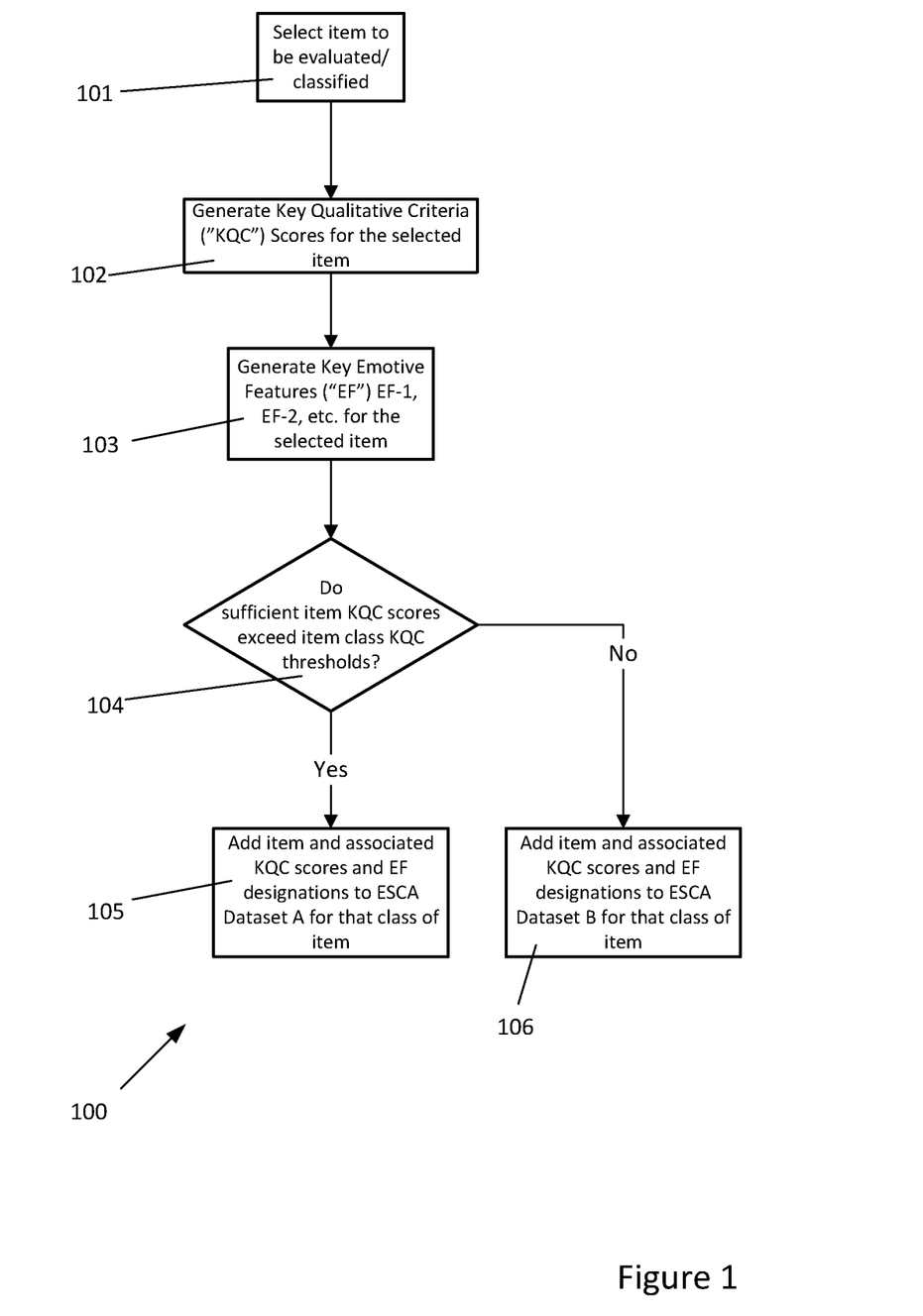
FIG. 1 is a flowchart describing a possible mode of operation for the categorization of items by the Evaluation/Classification System for the Creative Arts ("ESCA").

FIG. 1 shows a flowchart 100 detailing a possible mode of operation of a method for categorizing an item of creative art. It should be noted that the term "item of creative art" should be taken in the broadest sense as described above. Each of these may be considered a different class of the creative arts and each class may have many subsets that may also be known as genres for that class of creative art. In Step 101 an item is selected to be evaluated and/or classified. The flowchart then branches to step 102. In step 102 the Key Qualitative Criteria (the "KQC") of the item are generated. The generation of the KQC scores may be done in a number of ways and a detailed example of this is disclosed below in regards to FIGS. 3 and 4. The flowchart then branches to step 103. In step 103 the Key Emotive Features ("EF") of the item are generated. Each item may have one or more EF designations (EF-1, EF-2, etc.). Again, the generation of the EF designations may be done in a number of ways and a detailed example of this will be disclosed below. The flowchart then branches to step 104. In step 104 the system determines if sufficient generated item KQC scores exceed pre-set KQC thresholds for that class of item. If sufficient KQC scores do exceed the thresholds then the flowchart branches to step 105. If sufficient KQC scores do not exceed the thresholds then the flowchart branches to step 106. Alternately each subgroup or genre of a class of item may have discrete thresholds associated with them. In step 105 the system adds the item and its associated KQC scores and EF designations to Dataset A for that class or subgroup/genre of item. Dataset A is the database of items that meet certain quality criteria and from which future recommendations will be made. In step 106 the system adds the item and its associated KQC scores and EF designations to Database B for that class of item. Dataset B is the database of items that do not meet certain quality criteria for that class, and therefore future recommendations will not be made from, but may be used as a searchable database for that class of item, along with Dataset A, in order to facilitate future recommendations. It should be noted that for some classes of items one KQC threshold being exceeded may be sufficient in order to be added to Dataset A but another class of item may require two or more KQC thresholds to be exceeded.

Figure 2:
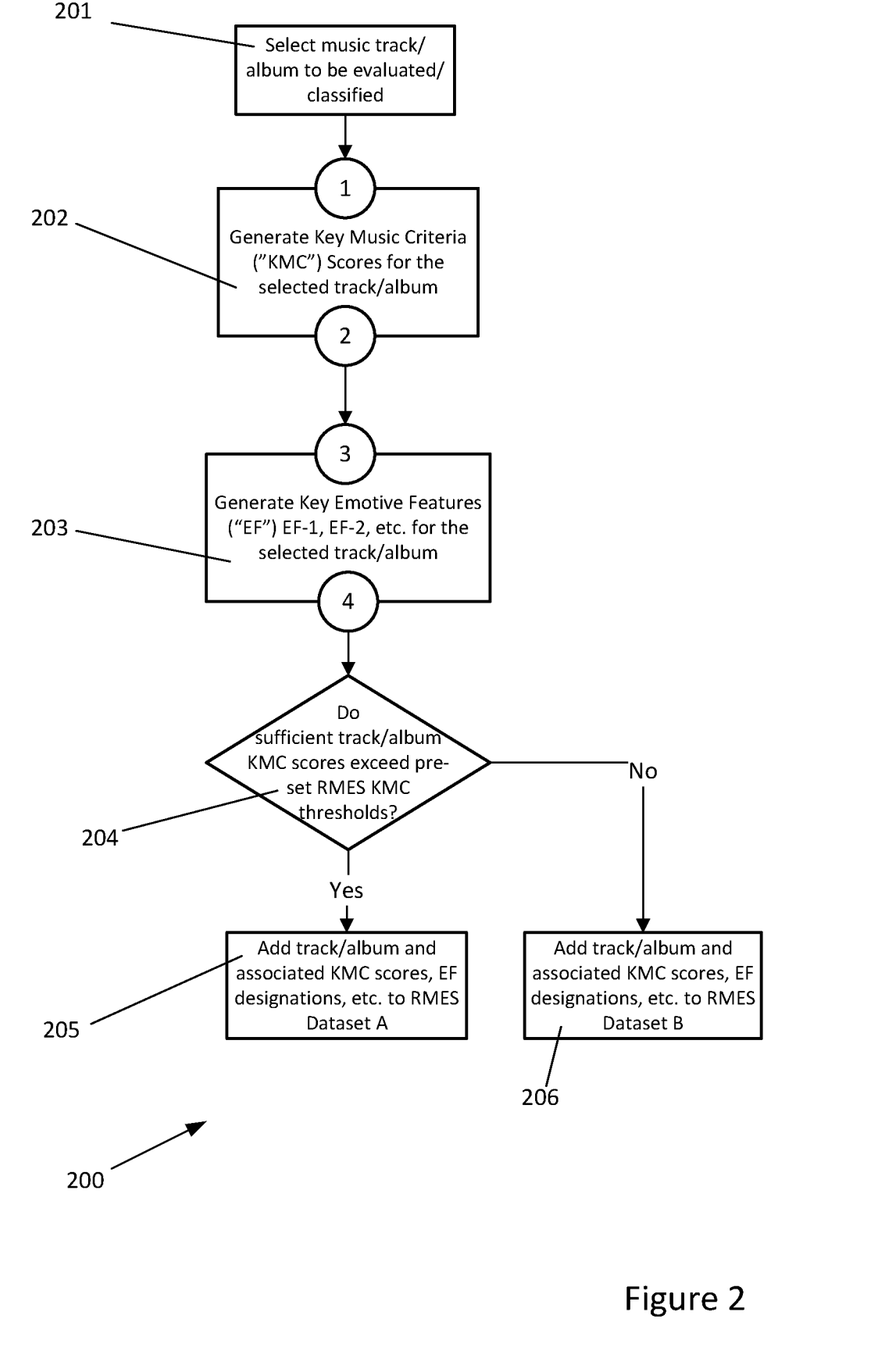
FIG. 2 is a flowchart describing a possible mode of operation for the categorization of music tracks or albums by the Recorded Music Evaluation/Classification System ("RMES").

FIG. 2 shows a flowchart 200 detailing a possible mode of operation of the categorization method illustrated in FIG. 1 specifically as it relates to music. This is defined as the Recorded Music Evaluation/Classification System ("RMES"). In step 201 a specific music track or album is selected for categorization. The flowchart then branches to step 202. In step 202 the Key Music Criteria ("KMC"), i.e. the KQC for music, scores for the selected track/album are generated. The flowchart then branches to step 203. In step 203 the EF designations for the selected track/album are generated. The flowchart then branches to step 204. In step 204 the system determines if sufficient generated track/album KMC scores exceed pre-set KMC thresholds for music. If sufficient KMC scores do exceed the thresholds for music then the flowchart branches to step 205. If sufficient KMC scores do not exceed the thresholds for music then the flowchart branches to step 206. In step 205 the system adds the track/album and its associated KMC scores, EF designations, genre, instrumental or not instrumental, release and/or recording date, instrument data, etc. to RMES Dataset A. RMES Dataset A is the database of tracks/albums that meet certain quality criteria and from which future recommendations will be made. In step 206 the system adds the item and its associated KMC scores, EF designations, genre, instrumental or not instrumental, release and/or recording date, instrument data, etc. to RMES Database B. RMES Dataset B is the database of items that do not meet certain quality criteria for that class, and therefore future recommendations will not be made from, but may be used as a searchable music database, along with RMES Dataset A, to facilitate future recommendations.

Figure 3:
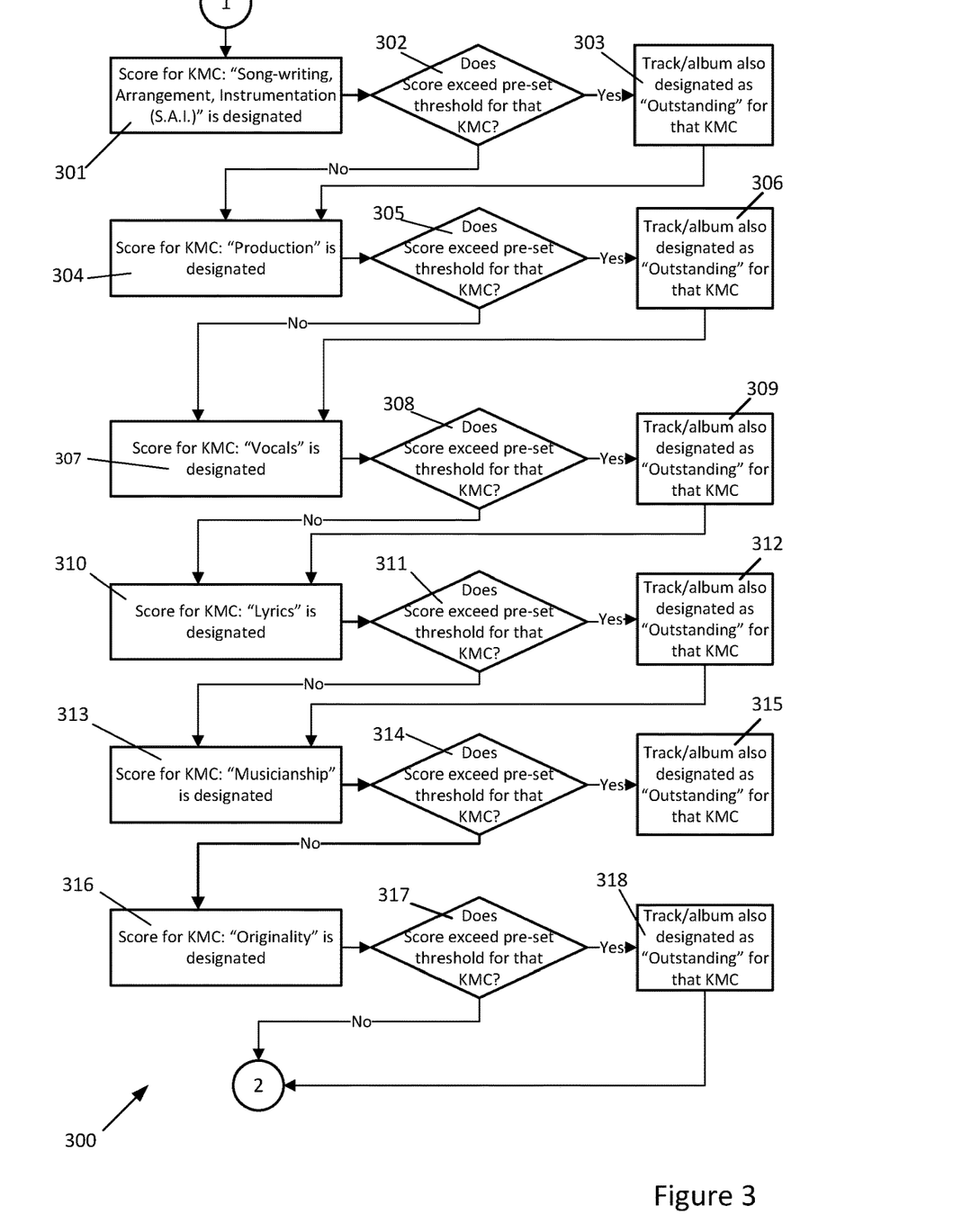
FIG. 3 is a flowchart describing a possible mode of operation of a system to generate Key Music Criteria ("KMC") for selected music tracks/albums.

FIG. 3 shows a flowchart 300 detailing a possible mode of operation of a system 202 to generate KMC scores for a specific track/album. Each score designation described below may be generated in a number of ways including but not limited to, by an expert in the field, automated averaging, etc. In step 301 a score for "Song-writing, Arrangement & Instrumentation" ("SAI") is designated. The flowchart then branches to step 302. In step 302 the system determines if the designated score exceeds a pre-set threshold for that specific KMC. If the score does exceed the threshold then the flowchart branches to step 303. If the score does not exceed the threshold then the flowchart branches to step 304. In step 303 the track/album is marked as "Outstanding" for that KMC. The flowchart then branches to step 304. In step 304 a score for "Production" is designated. The flowchart then branches to step 305. In step 305 the system determines if the designated score exceeds a pre-set threshold for that specific KMC. If the score does exceed the threshold then the flowchart branches to step 306. If the score does not exceed the threshold then the flowchart branches to step 307. In step 306 the track/album is marked as "Outstanding" for that KMC. The flowchart then branches to step 307. In step 307 a score for "Vocals" is designated. The flowchart then branches to step 308. In step 308 the system determines if the designated score exceeds a pre-set threshold for that specific KMC. If the score does exceed the threshold then the flowchart branches to step 309. If the score does not exceed the threshold then the flowchart branches to step 310. In step 309 the track/album is marked as "Outstanding" for that KMC. The flowchart then branches to step 310. In step 310 a score for "Lyrics" is designated. The flowchart then branches to step 311. In step 311 the system determines if the designated score exceeds a pre-set threshold for that specific KMC. If the score does exceed the threshold then the flowchart branches to step 312. If the score does not exceed the threshold then the flowchart branches to step 313. In step 312 the track/album is marked as "Outstanding" for that KMC. The flowchart then branches to step 313. In step 313 a score for "Musicianship" is designated. The flowchart then branches to step 314. In step 314 the system determines if the designated score exceeds a pre-set threshold for that specific KMC. If the score does exceed the threshold then the flowchart branches to step 315. If the score does not exceed the threshold then the flowchart branches to step 316. In step 315 the track/album is marked as "Outstanding" for that KMC. The flowchart then branches to step 316. In step 316 a score for "Originality" is designated. The flowchart then branches to step 317. In step 317 the system determines if the designated score exceeds a pre-set threshold for that specific KMC. If the score does exceed the threshold then the flowchart branches to step 318. If the score does not exceed the threshold then the flowchart branches to step 319. In step 318 the track/album is marked as "Outstanding" for that KMC. The flowchart then branches to step 319. The flowchart then branches to step 203.

Figure 4:
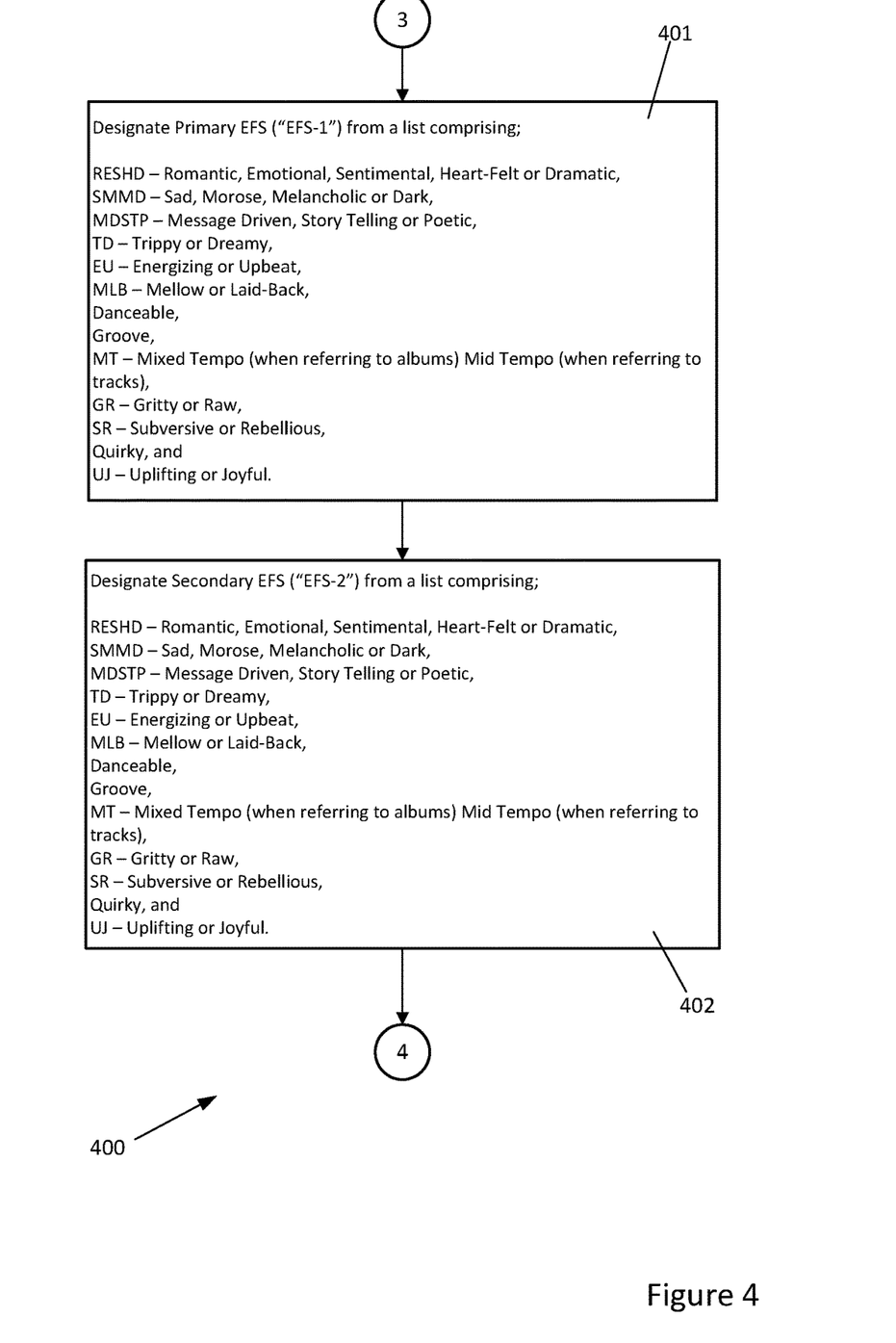
FIG. 4 is a flowchart describing a possible mode of operation of a system to generate Key Emotive Features ("EF") for selected music tracks/albums.

FIG. 4 shows a flowchart 400 detailing a possible mode of operation of a system 203 to generate EF designations for a specific track/album. Each designation described below may be generated in a number of ways including but not limited to, by an expert in the field, automated averaging, etc. In step 401 EF-1 is designated from but not limited to the following list of options;

RESHD—Romantic, Emotional, Sentimental, Heart-Felt or Dramatic,
SMMD—Sad, Morose, Melancholic or Dark,
MDSTP—Message Driven, Story Telling or Poetic,
TD—Trippy or Dreamy,
EU—Energizing or Upbeat,
MLB—Mellow or Laid-Back, Danceable,
Groove,
MT—Mixed Tempo (when referring to albums) Mid Tempo (when referring to tracks),
GR—Gritty or Raw,
SR—Subversive or Rebellious,
Quirky, and
UJ—Uplifting or Joyful.
The flowchart then branches to step 402. In step 402 EF-2 is once again designated from but not limited to the following list of options;
RESHD—Romantic, Emotional, Sentimental, Heart-Felt or Dramatic,
SMMD—Sad, Morose, Melancholic or Dark,
MDSTP—Message Driven, Story Telling or Poetic,
TD—Trippy or Dreamy,
EU—Energizing or Upbeat,
MLB—Mellow or Laid-Back,
Danceable,
Groove,
MT—Mixed Tempo (when referring to albums) Mid Tempo (when referring to tracks),
GR—Gritty or Raw,
SR—Subversive or Rebellious,
Quirky, and
UJ—Uplifting or Joyful.
The flowchart then branches to step 204.

Figure 5:
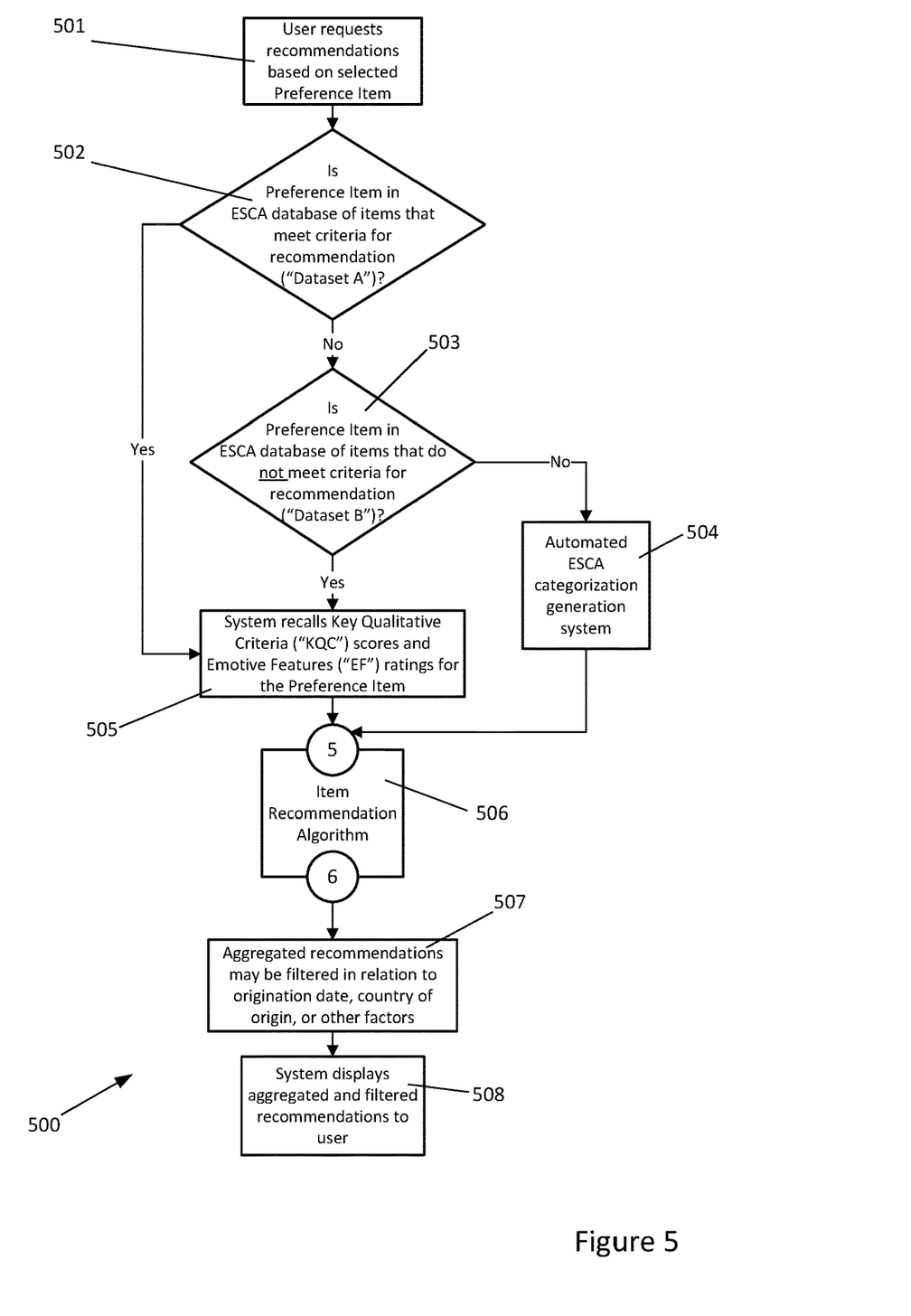
FIG. 5 is a flowchart describing a possible mode of operation of a system to generate recommendations based upon user indicated preference for a specific item.

FIG. 5 shows a flowchart 500 detailing a possible mode of operation of a system to generate recommendations based upon user indicated preference for a specific item. In step 501 a user requests recommendations based upon a selected item (the "Preference Item"). The flowchart then branches to step 502. In step 502 the system determines if the Preference Item is in the existing ESCA dataset for that class of item that meet the criteria for recommendation (Dataset A). If the Preference Item is in Dataset A the flowchart branches to step 505. If the Preference Item is not in Dataset A the flowchart branches to step 503. In step 503 the system determines if the Preference Item is in the existing ESCA dataset for that class of item that do not meet the criteria for recommendation (Dataset B). If the Preference Item is in Dataset B the flowchart branches to step 505. If the Preference Item is not in Dataset B the flowchart branches to step 504. In step 504 a system approximates the KQC scores and EF designations for the Preference Item. This system for approximating the KQC scores etc may function in various ways and a detailed description of one possible mode of operation of such a system is disclosed below. The flowchart then branches to step 506. In step 505 the system recalls the KQC scores and EF designations associated with the Preference Item. The flowchart then branches to step 506. In step 506 recommendations based upon the KQC scores and EF designations of the Preference item are generated by the Item Recommendation Algorithm. The flowchart then branches to step 507. In step 507 filtering of the aggregated recommendations such as for origination date, country of origin or other factors is applied. The flowchart then branches to step 508. In step 508 the aggregated and filtered recommendations are presented to the user of the system.

Figure 6:
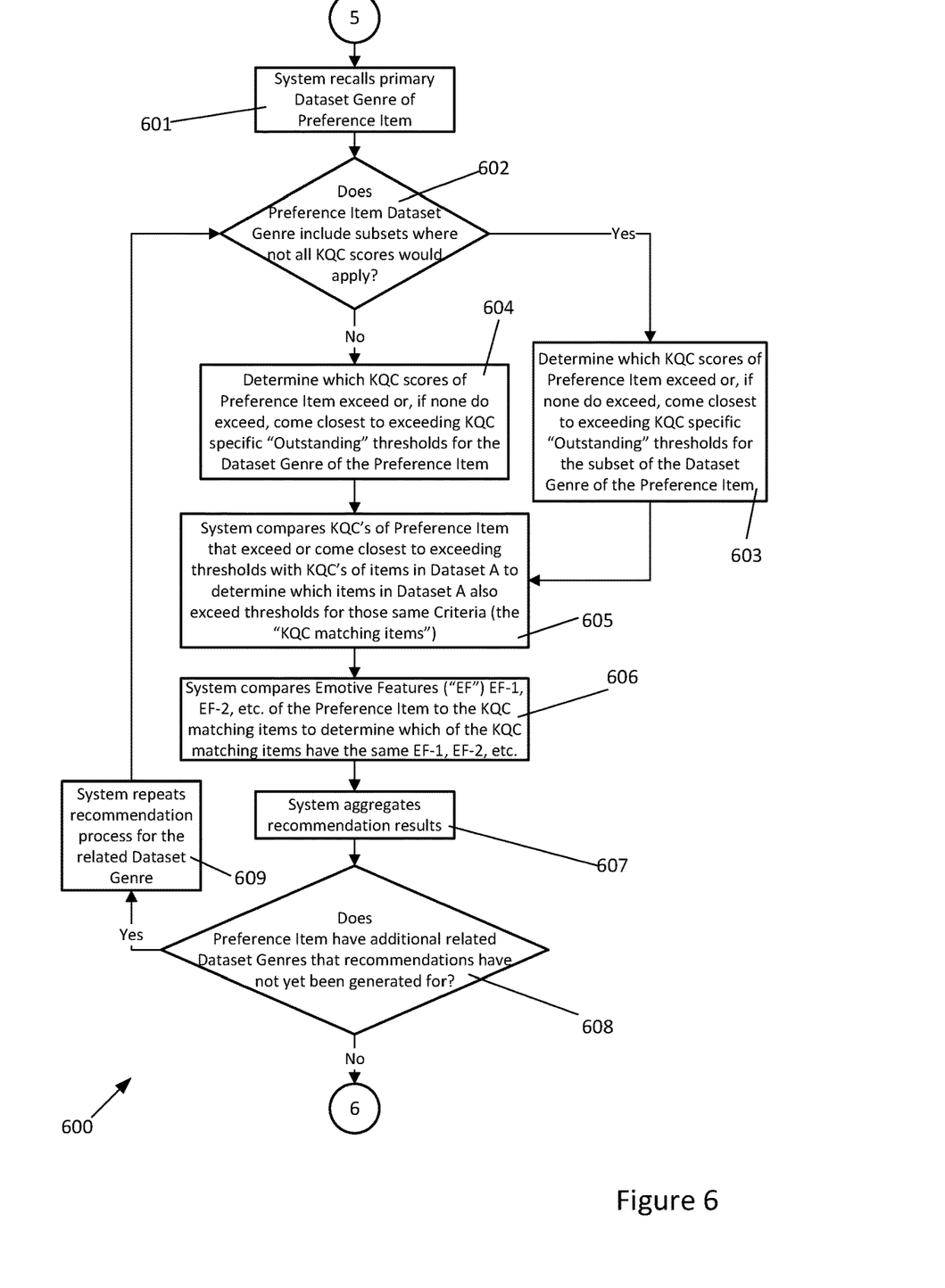
FIG. 6 is a flowchart describing a possible mode of operation of an item recommendation algorithm.

FIG. 6 shows a flowchart 600 detailing a possible mode of operation of the ESCA Recommendation Engine 506. In step 601 the system recalls the primary Dataset Genre of the Preference Item. The flowchart then branches to step 602. In step 602 the system determines whether the Dataset Genre includes subsets where some KQC scores of the parent Dataset Genre may not apply and other KQC thresholds may be modified accordingly. An example of this would be an instrumental piece of music in which vocals and lyrics would not apply. If the Dataset Genre does include such subsets the flowchart branches to step 603. If the Dataset Genre does not include such subsets the flowchart branches to step 604. In step 604 the system determines which KQC scores of the Preference Item exceed, or if no KQC scores exceed come closest to exceeding, KQC specific "Outstanding" thresholds for the Dataset Genre of the Preference Item. The flowchart then branches to step 605. In step 603 the system determines which KQC scores of the Preference Item exceed, or if no KQC scores exceed come closest to exceeding, KQC specific "Outstanding" thresholds for the subset of the Dataset Genre of the Preference Item. The flowchart then branches to step 605. In step 605 the system compares the KQC's of the Preference Item that exceeded, or if no KQC score exceeded came closest to, to the items in Dataset A to determine which items in Dataset A also exceed the thresholds for those same KQC (the "KQC matching items"). The flowchart then branches to step 606. In step 606 the system compares the Key Emotive Features EF-1 and EF-2 of the Preference Item to the EF designations of the KQC matching items to determine which of the KQC matching items have the same EF-1 and EF-2 of the Preference Item. The flowchart then branches to step 607. In step 607 the system aggregates the results of steps 605-606. The flowchart then branches to step 608. In step 608 the system determines whether the Preference Item has one or more related Dataset Genres that should also be considered. An example of this would be music track that has as its primary Dataset Genre of "Latin" but also has a related Dataset Genres of "Brazilian" and "Flamenco". If the Preference Item does have a related Dataset Genre that has not been considered the flowchart branches to step 609 and then branches to step 602 to initiate the process for the unconsidered related dataset Genre. If the Preference Item does not have a related Dataset Genre that has not been considered by the system the flowchart branches to step 507.

Figure 7:
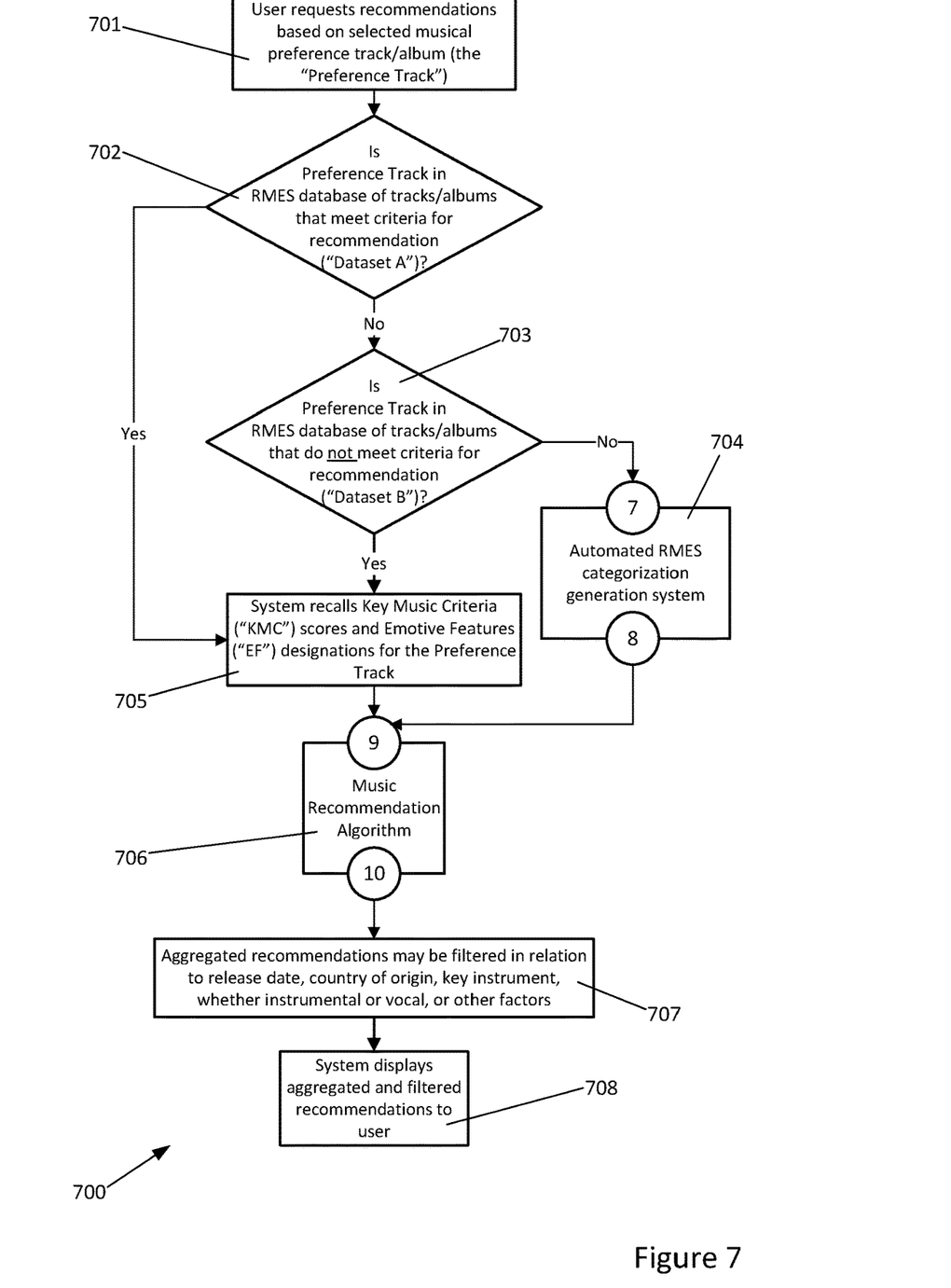
FIG. 7 is a flowchart describing a possible mode of operation of a system to generate music recommendations based upon user indicated preference for a specific music track or album.

FIG. 7 is a flowchart 700 detailing a possible mode of operation of a system to generate music recommendations based upon user indicated preference for a specific music track or album. In step 701 a user requests recommendations based upon a selected musical track or album (the "Preference Track"). The flowchart then branches to step 702. In step 702 the system determines if the Preference Track is in the existing RMES dataset of tracks/albums that meet the criteria for recommendation (Dataset A). If the Preference Item is in Dataset A the flowchart then branches to step 705. If the Preference Item is not in Dataset A the flowchart then branches to step 703. In step 703 the system determines if the Preference Track is in the existing RMES dataset of tracks/albums that do not meet the criteria for recommendation (Dataset B). If the Preference Track is in Dataset B the flowchart branches to step 705. If the Preference Track is not in Dataset B the flowchart branches to step 704. In step 704 a system approximates the KQC scores and EF designations for the Preference Item. The flowchart then branches to step 706. In step 705 the system recalls the KQC scores and EF designations associated with the Preference Track. The flowchart then branches to step 706. In step 706 recommendations based upon the KQC scores and EF designations of the Preference Track are generated by the Music Recommendation Algorithm. The flowchart then branches to step 707. In step 707 filtering of the aggregated recommendations such as for release date, country of origin, key instrument used, whether instrumental or vocal, or other factors is applied. The flowchart then branches to step 708. In step 708 the aggregated recommendations are presented to the user of the system.

Figure 8:
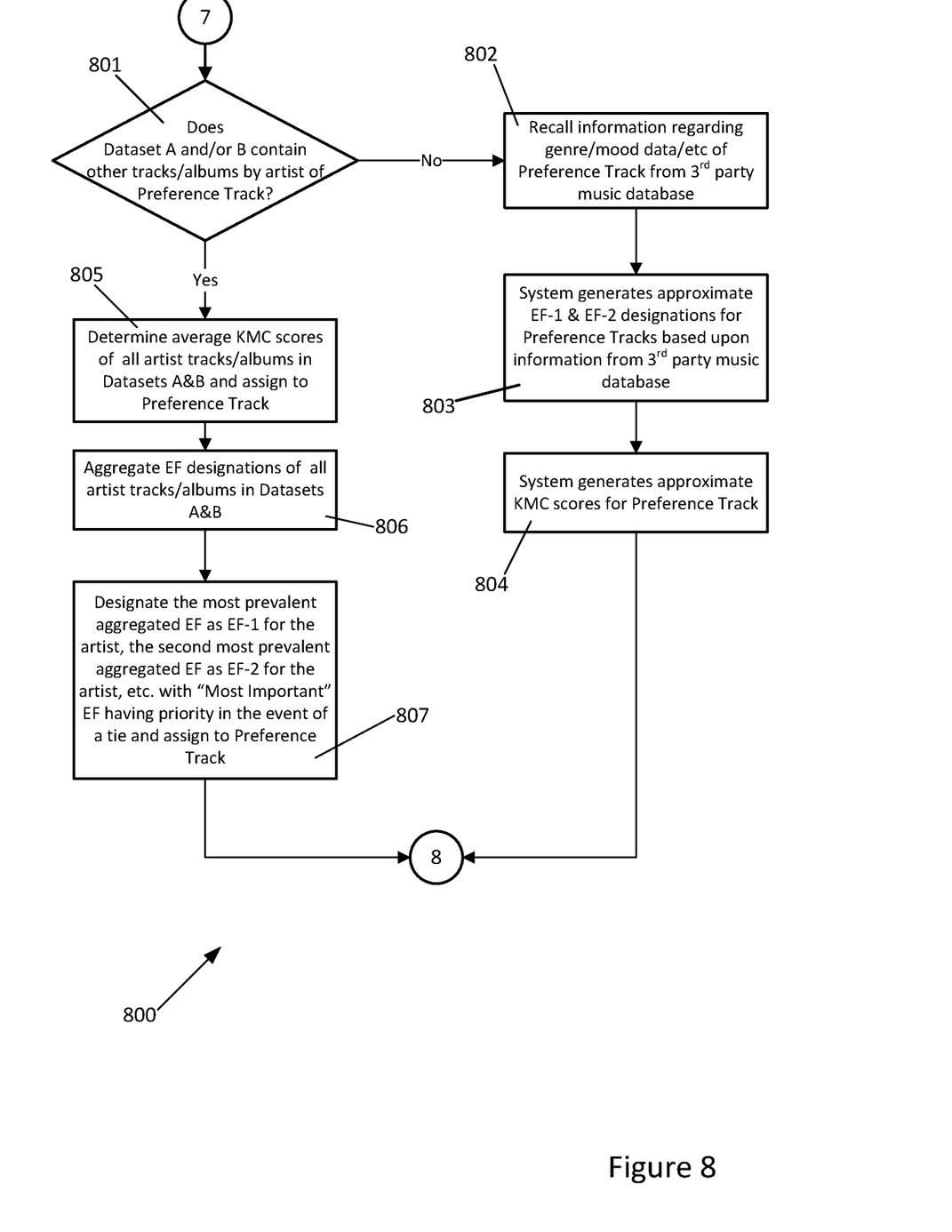
FIG. 8 is a flowchart describing one possible mode of operation of an automated RMES categorization system.

FIG. 8 is a flowchart 800 detailing one possible mode of operation of an automated RMES categorization system 104. In step 801 the system determines if Datasets A and/or B contain other tracks/albums by the artist of the Preference Track. If Datasets A and/or B do contain tracks/albums by the artist of the Preference Track the flowchart branches to step 805. If Datasets A and/or B do not contain tracks/albums by the artist of the Preference Track the flowchart branches to step 802. In step 805 the system averages the KMC scores of all artist tracks/albums in Datasets A&B. The flowchart then branches to step 806. In step 806 the system aggregates all EF designations of all artist tracks/albums available in Datasets A&B. The flowchart then branches to step 807. In step 807 the system designates the most prevalent EF for that artist as EF-1, the second most prevalent as EF-2, etc. with the "most important" EF having priority in the event of a tie. The flowchart then branches to step 706. In step 802 the system recalls information regarding genre and mood of the Preference track from a $3^{rd}$ party music database. The flowchart then branches to step 803. In step 803 the system generates approximate EF designations for the Preference Track based upon the genre and mood information. Once again this may be done by proprietary algorithm or other means. The flowchart then branches to step 804. In step 804 the system generates approximate KMC scores for the Preference Track. Once again this may be done by proprietary algorithm or other means. The flowchart then branches to step 706.

Figure 9:
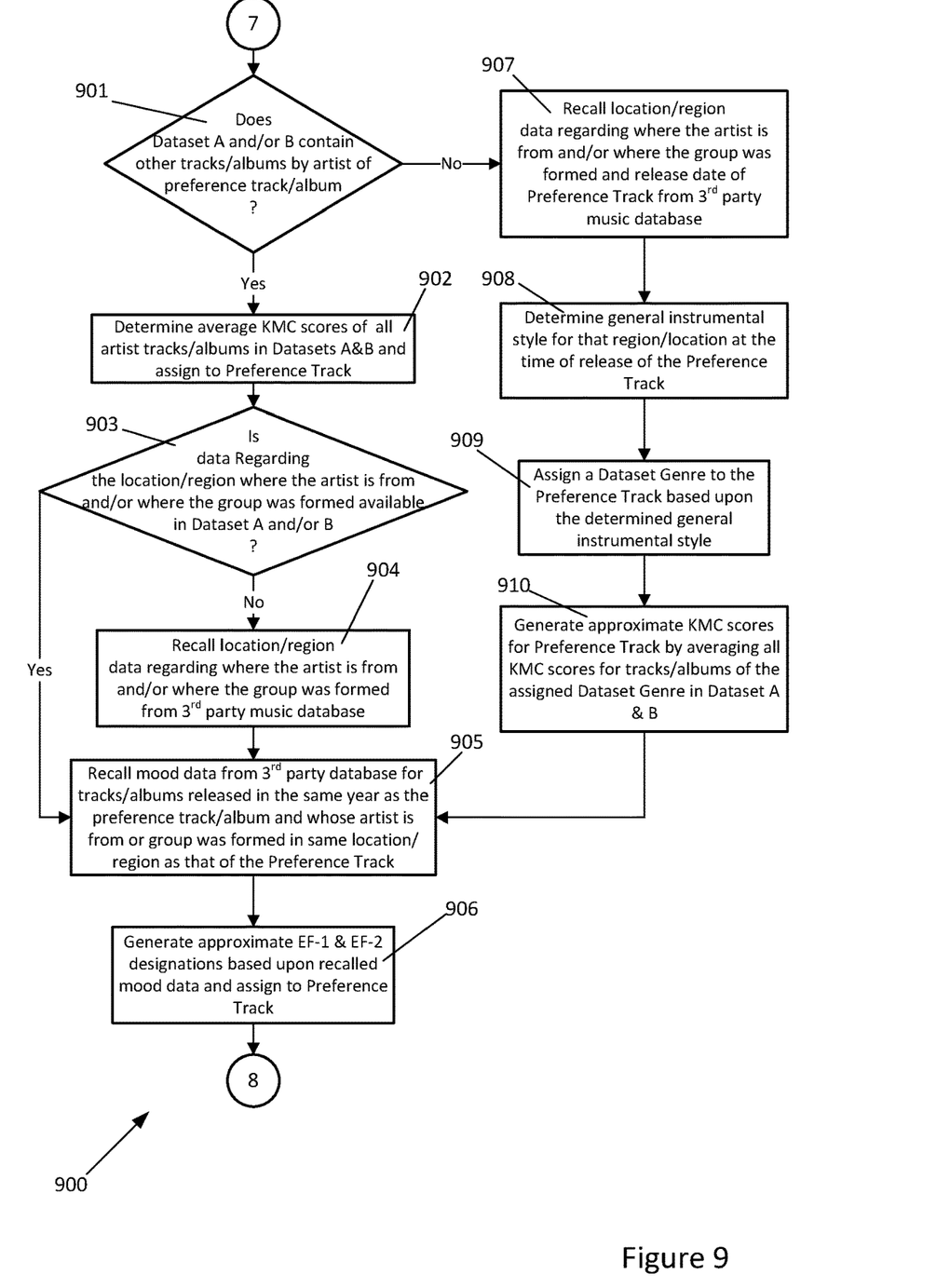
FIG. 9 is a flowchart describing a second possible mode of operation of an automated RMES categorization system.

FIG. 9 is a flowchart 900 detailing a second possible mode of operation of an automated RMES categorization system 104. In step 901 the system determines if Datasets A and/or B contain other tracks/albums by the artist of the Preference Track. If Datasets A and/or B do contain tracks/albums by the artist of the Preference Track the flowchart branches to step 902. If Datasets A and/or B do not contain tracks/albums by the artist of the Preference Track the flowchart branches to step907. In step 902 the system averages the KMC scores of all artist tracks/albums in Datasets A&B. The flowchart then branches to step 903. In step 903 the system determines if information regarding the location/region where the artist is from or where the group was formed is available in Datasets A and or B. If such location data is available the flowchart then branches to step 905. If I such location data is not available the flowchart branches to step 904. In step 904 the system recalls such location data from a $3^{rd}$ party music database. The flowchart then branches to step 905. In step 905 the system recalls mood data from a $3^{rd}$ party database for tracks released in the same year as the Preference Track and whose artist is from or group was formed in same location/region as that of the Preference Track. The flowchart then branches to step 906. In step 906 the system generates approximate EF-1 and EF-2 designations based upon averaged recalled $3^{rd}$ party mood data and assigns these EF designations to the Preference Track. In step 907 the system recalls location/region data regarding where the artist is from and/or where the group was formed along with release date data for the Preference Track form a $3^{rd}$ party music database. The flowchart then branches to step 908. In step 908 the system determines the general instrumental style for that region/area at the time of release of the Preference Track. The flowchart then branches to step 909. In step 909 the system assigns a Dataset Genre to the Preference Track based upon the determined general instrumental style. The flowchart then branches to step 910.

In step 910 the system generates approximate KMC score for the Preference Track by averaging all KMC scores for songs of the Assigned Dataset Genre in Datasets A&B. the flowchart then branches to step 905.

Figure 10:
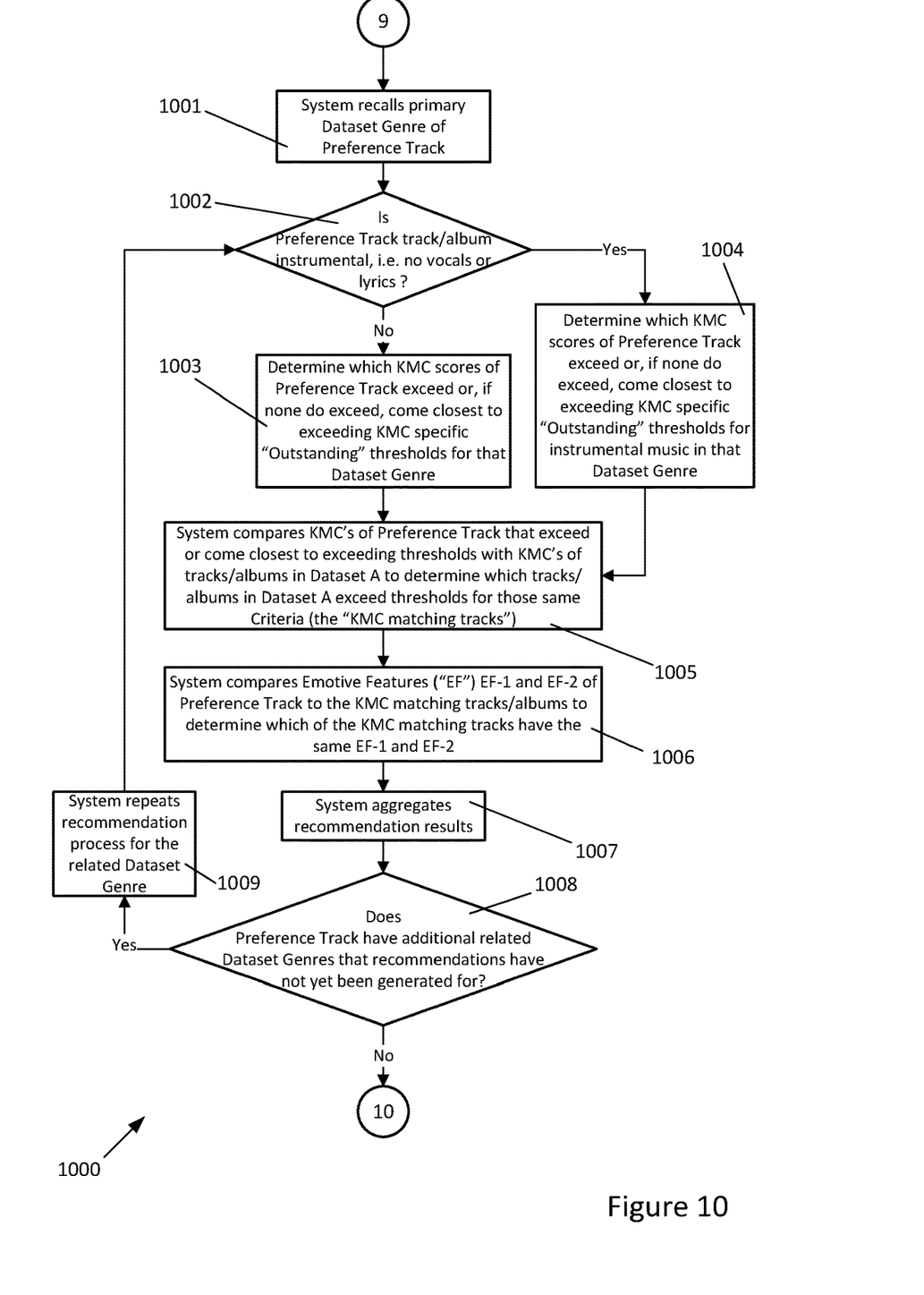
FIG. 10 is a flowchart describing a possible mode of operation of a music recommendation algorithm

FIG. 10 shows a flowchart 1000 detailing a possible mode of operation of the Music Recommendation Algorithm 706. In step 1001 the system recalls the primary Dataset Genre of the Preference Track. The flowchart then branches to step 1002. In step 1002 the system determines whether the Preference Track is instrumental, i.e. no lyrics or vocals, and therefore some KMC sores should not be considered. If the Preference Track is not instrumental the flowchart then branches to step 1003. If the Preference Track is instrumental the flowchart then branches to step 1004. In step 1003 the system determines which KMC scores of the Preference Track exceed, or if no KMC scores exceed come closest to exceeding, KMC specific "Outstanding" thresholds for the Dataset Genre of the Preference Track. The flowchart then branches to step 1005. In step 1004 the system determines which KMC scores of the Preference Track exceed, or if no KMC scores exceed come closest to exceeding, KMC specific "Outstanding" thresholds for the "instrumental" subset of the Dataset Genre of the Preference Item. It should be noted that for some tracks multiple KMC's may be above threshold and if all above threshold KMC's are used to make a match this may severely limit the ability of the system to make a recommendation. By using an order of importance for the KMC's the system may, for example, only use the top two most "important" KMC's for matching. One possible KMC order of importance is as follows;

1. SAI
2. Vocals
3. Originality
4. Lyrics
5. Musicianship
6. Production

The number of KMC's considered may be adjusted given the size of dataset available for that genre, with a larger sample size three rather than two KMC's may be considered while still giving a very good likelihood of a match. The flowchart then branches to step 1005. In step 1005 the system compares the KMC's of the Preference Track that exceeded, or if no KMC score exceeded came closest to, to the items in Dataset A to determine which tracks in Dataset A also exceed the thresholds for those same KMC (the "KMC matching tracks"). The flowchart then branches to step 1006. In step 1006 the system compares the Key Emotive Features EF-1 and EF-2 of the Preference Track to the EF designations of the KMC matching tracks to determine which of the KMC matching items have the same EF-1 and EF-2 of the Preference Track. It should be noted that a match could also be made if a matching track had the same Key Emotive Features of the Preference Track but in a different importance order, i.e. EF-1 of the Preference Track matches EF-2 of the matching track and EF-2 of the Preference Track matches EF-1 of the matching track. The flowchart then branches to step 1007. In step 1007 the system aggregates the results of steps 1005-1006. The flowchart then branches to step 1008. In step 1008 the system determines whether the Preference Item has one or more related Dataset Genres that should also be considered. This is accomplished by utilizing a Music Genre Cluster Table. An example of this would be a song that has "Jazz" as its primary Dataset Genre but also has related Dataset Genres "Stage & Screen", "Blues", "Easy Listening" and "Vocal". Follows is an exemplar Genre Cluster Table;

| Primary Genre | Related Genres |
|---|---|
| Alt/Indie | Folk |
|  | Punk/New Wave |
|  | Electronica/dance |
| Ambient/New Age | Electronica/dance |
|  | Stage & Screen |
|  | World |
|  | Experimental/Avant-Garde |
|  | Religious/spiritual |
|  | Folk |
| Blues | Jazz |
| Brazilian | Flamenco |
|  | Latin |
|  | World |
| Classical |  |
| Country | Folk |
| Easy Listening | Country |
|  | Jazz |
|  | Vocal |
| Electronica/dance | R&B |
| Experimental/Avant-Garde |  |
| Folk | Country |
|  | Flamenco |
| Flamenco | Brazillian |
| French Pop |  |
| Hip-hop/rap |  |
| Jazz | Stage & Screen |
|  | Easy Listening |
|  | Blues |
|  | Vocal |
| Latin | Brazillian |
|  | Flamenco |
| Metal | Rock |
| Pop |  |
| Punk/New Wave | Alt/Indie |
|  | Electronica/dance |
|  | Reggae |
|  | Rock |
| R&B | Hip-hop/rap |
|  | Jazz |
| Reggae |  |
| Religious/spiritual | Ambient/New Age |
|  | Folk |
|  | Jazz |
|  | R&B |
|  | Vocal |
|  | World |
| Rock | Alt/Indie |
|  | Ambient/New Age |
|  | Metal |
|  | Punk/New Wave |
| Spoken/Comedy |  |
| Stage & Screen | Ambient/New Age |
|  | Classical |
|  | Experimental/Avant-Garde |
|  | Jazz |
| Teen Pop | Pop |
| Vocal | Brazillian |
|  | Country |
|  | Easy Listening |
|  | Jazz |
|  | Pop |
|  | R&B |
|  | Religious/spiritual |
|  | Stage & Screen |
|  | World |
| World | Brazillian |
|  | Flamenco |
|  | French Pop |
|  | Latin |
|  | Folk |

If the Preference Track does have a related Dataset Genre that has not been considered then the flowchart branches to step 1009, and then branches to step 1002 to initiate the process for the unconsidered related Dataset Genre. If the Preference Track does not have a related Dataset Genre that has not been considered by the system the flowchart branches to step 707.

It should be noted that the system could also function in the case of a user selecting specific KQC's and EF's and then requesting recommendations based on those selected KQC's and EF's. It is also possible to match a current Preference Track to a user determined year in the past. This could potentially give a young user who happens to like a particular type of music an insight into similar genre/KMC/EF combinations from the past. Conversely, it is possible to match an older Preference Track to a user determined year in the future. For example, an older user who is perhaps interested in finding out a modern equivalent of the music that they love and have been listening to for many years simply keys in a recent year and the system finds similar genre/KMC/EF combinations.

It should also be noted that the system may be used not only to produce recommendations but may also be used to produce auto-curated playlists based upon the Preference Track. The playlist may be simply a group of Tracks that meet the recommendation criteria of the Preference Track or, in a more advanced embodiment, may be a series of recommendations, one based upon another. I.e. The system makes Recommendation A based upon the Preference Track, Recommendation B based upon Recommendation A, Recommendation C based on Recommendation B, etc. Such a playlist would then consist of Recommendations A, B, C, In addition, a playlists may also be modified by other factors such as time, place, etc. as described below for modifying recommendations. Auto-curated playlists are dynamic not static. What this means is as tracks are added on a daily basis to RMES Dataset A, the output from the auto-curated playlists will change when the auto-curated playlists are run each day. These auto-curated playlists can also be auto-generated by the system automatically generating seed tracks. Thousands of playlists can be auto-generated this way.

It should be noted that EF's (Emotive Features) differ from what is generally known as mood. EF's are much more emotionally impactful than moods and are what an average person would hear/feel instantaneously from a piece of music. EF's are also different from the mood the piece of music may evoke in the listener which is not possible to determine as different pieces of music have different effects on listeners at different moments of the day. For example a Gritty, Raw, Danceable music track will most likely evoke a different reaction in a listener when it is heard at 7 pm on a Friday night than at 7:30 am on a Sunday morning.

Example:
Example of the Adele track 'Chasing Pavements' as found in the RMES Dataset
Name: Adele
Track name: Chasing Pavements
Release or Recording Date: 2008
Genre: Pop (no related genres as shown in the genre cluster table above)
Country Formed or of Birth: UK
Key Music Criteria: Originality, Vocals, SAI
Key Emotive Features: EF1-RESHD, EF2-MLB
This then tells us that the listener whether they have realized it themselves or not has a preference for Pop from 2008 with a bias towards Originality, Vocals, Songwriting, Arrangement and Instrumentation that is Romantic, Emotional, Dramatic, Mellow or Laid-Back—at that moment in time and recommendations can be made accordingly. It should be noted that 'At that moment in time', is key as an hour later when the listener is getting ready to go out they may ask for a recommendation based on a track that is entirely different such as "Superstylin" by Groove Armada which is in the "Electronica/dance" Genre.

Other Factors that May Modify Recommendations:

Key Qualitative Criteria & Emotive Features are both considered in the creative arts recommendation systems described herein. One or more of the KQC scores or EF designations of the Preference Item or one or more of the KQC thresholds for a Dataset Genre may be modified due to differing circumstances encountered at the time of the requested recommendation.

Time Spent Using, Listening Etc.

Simply purchasing an item may not actually be an indication of interest. As an example, a user may have purchased all versions of the Angry Birds app but rarely plays them. Instead the users most used game app is Sudoku. This would indicate a more cerebral user and this may modify the recommendation process accordingly.

Proximity to Others:

Are other people around? Are you listening on headphones? The determination of content due to others around you could be altered as could the genre of the desired media. The Qualitative criteria of a recommendation may change if you are listening on headphones or alone. No foul language or overt sexuality in the lyrics if children are present—unless you have your headphones on. The device could sense that the headphones were attached or Bluetooth headphones in use and alter the criteria levels. Letting the device know who is around could be manually inputted or generated by known position of phones, watches or Fitbit like devices of others. The Emotive Features may vary if you are looking for a movie recommendation by yourself or if you are watching with your partner, children or friend, as might the Key Qualitative Criteria. Instead of an action movie with a lot of explosions a romantic comedy may be recommended.

Age of the User of the System:

For example, if the user of the system is a child under the age of 18 then the recommendations may be further filtered to remove any recommendations that contain explicit lyrics.

Time of Day:

The time of day that the recommendation is being generated could have an impact on the desired Key Qualitative Criteria & Emotive Feature settings. Music mood/emotion based on hour of day, known activities during that time and day of the week. Key criteria threshold based on the same. It doesn't have to be the best recording, just good motivational lyrics and a good beat because I'm waking up. Work time vs. leisure time.

Day of the Week:

The day of the week may modify the Key Qualitative Criteria & Key Emotive Feature thresholds. E.g. during the week the user may want something calming but on a Saturday perhaps something more upbeat.

Time of Year/Season:

The time of year or season may modify the Key Qualitative Criteria & Emotive Feature settings.

Location of User:

The physical location of the user that the recommendation is being generated for could have an impact on the desired Key Qualitative Criteria & Emotive Feature thresholds. If a person finds themselves in a certain country or city that has a popular style of music associated with it, Grunge in Seattle, Jazz in New Orleans etc, that could cause the Criteria to change. If the recommendation is being requested at the users work or their home the recommendation criteria could also change. The type of location of the user that the recommendation is being generated for could also have an impact on the desired Key Qualitative Criteria & Emotive Feature thresholds. A church may have a different set of criteria than a fraternity or sorority and the recommendation would reflect that. The type of apps recommended for your tablet computer or phone could use the same criteria and be tailored to be location and area appropriate.

Speed or Motion of User:

The speed or motion of the user that the recommendation is being generated for could have an impact on the desired Key Qualitative Criteria & Emotive Feature thresholds. Using GPS or other positioning means the system could deduce if you were driving fast or in stop and go traffic the recommendation criteria could be altered; fast tempo for faster driving for instance, or emotionally calming music for stop and go traffic. Pedometers could also be employed to drive the criteria depending on how fast you were walking or running (or skiing). If you hadn't taken enough steps in a day emotionally motivational music could be recommended to get you moving.

Lighting and Illumination:

The lighting and illumination, i.e. the ambient light, at the location of the user that the recommendation is being generated for could have an impact on the desired Key Qualitative Criteria & Emotive Feature thresholds. A qualitative feature like how light or dark most scenes in a film could be changed based on how bright it is. A dark film is very hard to watch in bright light so only films that were mostly bright would be recommended.

Weather and Temperature:

Weather & temperature could affect the desired criteria. If it was gloomy only emotionally uplifting music might be recommended, or if it was sunny a certain genre could be recommended above others, surf music for instance. Temperature in a room may also be a modifier.

Mood of User:

Ones mood, perhaps manually inputted, derived from a social network post (I'm feeling annoyed etc) or sensed somehow, may affect the desired criteria for a recommendation. E.g. Someone who is feeling sad may want more uplifting and joyful music. Someone who may be feeling angry may want a more gritty/raw music or genre such as Metal or Hip-hop/rap. The music recommendations may be intended to enhance or reverse the mood of the person.

Users Physical State:

Ones physical state, heart rate, temperature, perspiration and general health, may affect the desired criteria for a recommendation. A person with a cold may be given recommendations for soothing styles of music or perhaps a television show that is good for binge watching.

User Profile:

Over time a user profile will be accumulated

Cross-pollination of disciplines. This could also allow the system to make recommendations for one field based upon the profile from another without having a Preference Item to base recommendation on, e.g. a user asks for a movie recommendation and, based upon the user profile for that time of day and day of the week that indicates a preference for mellow music, a movie with similar Emotive Features may be recommended.

Crowd-Sourcing:

A variation on the Recommendation Engine may be a system that polls users at a venue/party/social network and downloads the user profiles and modifies music to be played accordingly, i.e. a group recommendation system. The system would have a baseline KMC and EF set for that place at that time that could be modified by the aggregate profiles of those in attendance. And this modification could change over time, e.g. as night goes on crowd get younger and music is changed accordingly.

A specific example of such a crowd-sourced system is a system known as the "Playlist King". Playlist King is a system for joining parties in order to create joint playlists in any environment using the Music MVTRIX Algorithm. For Whom: The system is for any listener that wants to share their musical preferences with 'Environments' that want to create a shared jukebox. Environment: Any shared space where music is played for instance stores/shops, hotels, restaurants, bars, clubs, parties, dinner parties, car journeys, boats etc. How: Via smartphone devices using Bluetooth or wireless connectivity to a dedicated 'black box' in the 'Environment' which in turn connects to a speaker system. Example: A customer enters a store/shop and a message pops up on their smartphone and asks if they want to contribute to the music selection. Via a dedicated app the smartphone automatically sends the customers immediate and short-term music preference data and long term taste patterns (i.e. what they really dislike). The information is received by a dedicated 'receiver module' which collates the information along with its own pre programmed base data playlist for what music is appropriate on that date/time of day, using the collated customer data as modifiers. When the customer leaves the store/shop that customers data is deleted.

Active Radio Shows & Active Playlists:

Active Radio Shows can be created by making defined parameter entries into the rules within a form. Parameters that can be changed within each rule are not limited to; genre, EFs, minimum and maximum date and or year of release, KMC's, instrumental or not instrumental, EF exceptions and position(s) within a show. The length of Active Radio Shows can be created using time as in traditional radio shows, for example 60 minutes in length or alternatively they can be created by number of tracks. Relevant music news or any other item, such as and not limited to; local weather, local, national and international news, traffic updates can also be added as an insert to the show if desired. When a given Active Radio Show title is refreshed it will use the same set of rules but create a new selection of tracks. As new tracks appear in Dataset A on a daily basis a daily Radio Show is created at the click of a button. If the user likes a certain amount of track repetition, then the amount of repetition can be set by the user. Active Playlists can be created in exactly the same way as the above. It should be noted that Active Radio Shows/Playlists are initially created manually by making rules, once these rules for Active Radio Shows/Playlists are set then the Active Radio Shows/Playlists become fully automated in generating new track combinations once refreshed. This is different to dynamic playlists that can auto-generate from a Preference Track or system generated Seed Track.

Back to Back Active Radio Shows/Playlists:

Any number of Active Radio Shows/Playlists can be merged back to back in order to create a whole Radio Station format, Radio Shows changing with the time of day.

Instant Playlist from History:

An algorithm may be created to generate a playlist from the user's history. The history could be over any period of time for example a month, week, day or hour. An Instant Playlist looks at tracks/albums from the user's history and compares parameters not limited to the track/album EF's, KMC's, Genre, Release Date etc to find similar combinations in tracks/albums from RMES Dataset A that have not been heard during the period of the history. These results are then displayed to the user in Instant Classic or Instant Modern mode. Instant Classic finds tracks/albums near to the release dates in the history, Instant Modern interpolates to give modern tracks/album playlist results from the same set of tracks/albums regardless of their age.

Although these examples are all in music, there is no reason why they could not be included in ESCA. For example, TV programming, Art going back or forward in time with same EF's and KQC's, Books going back or forward in time with same EF's and KQC's', etc.

The invention claimed is:

1. A method for recommending data file items, the method comprising:
  repeating for all data file items in a group of data file items:
    determining key qualitative criteria (KQCs) for a group of data file items for classification;
    selecting a data file item from the group of data file items for classification;
    generating KQC scores for the data file item selected;
    generating emotive features (EFs) for the data file item selected, wherein the EF are distinct from the KQCs;
    determining first KQC thresholds for a first class, wherein the first KQC thresholds are associated with a first subset of the KQCs for the group of data file items for classification;
    determining second KQC thresholds for a second class, wherein the second KQC thresholds are associated with a second subset of the KQCs for the group of data file items for classification that is different than the first subset of the KQCs;
    classifying the data file item selected into the first class if the KQC scores of the data file item selected exceed the first KQC thresholds for the first class; and
    classifying the data file item selected into the second class if the KQC scores of the data file item selected exceed the first KQC thresholds for the second class;
  receiving user input data identifying a preference data file item from the classified group of data file items;
  identifying if the preference data file item has been classified in the first class or the second class and the subset of KQCs associated with that class, where KQCs that are not associated with the subset of KQC thresholds of identified class are ignored;
  identifying an emotive feature (EF) from the previously determined;
  generating a recommendation of a related data file item from the group of data file items, where:
    scores for the identified KQC associated with the related data file item also exceed the KQC thresholds associated with the identified class of the preference data file item; and
    an EF of the set of EFs for the related data file item matches the identified EF of the preference data file item;
  recalling the related data file item generated by the recommendation;
  aggregating the related data file item generated by the recommendation to a list and presenting information designating the list to the user.

2. The method according to claim 1 wherein the KQCs are specific to a specified area associated with the preference data file item.

3. The method according to claim 1 wherein generating a recommendation of a related data file item includes generating the recommendation of the related data file item further based on a local time of day.

4. The method according to claim 1 wherein generating a recommendation of a related data file item includes generating the recommendation of the related data file item further based on a local time of year.

5. The method according to claim 1 wherein generating a recommendation of a related data file item includes generating the recommendation of the related data file item further based on local geographic location.

6. The method according to claim 1 wherein generating a recommendation of a related data file item includes generating the recommendation of the related data file item further based on proximity of a device to other devices or persons.

7. The method according to claim 1 wherein generating a recommendation of a related data file item includes generating the recommendation of the related data file item further based on time spent using a device and/or listening to a specific musical selection.

8. The method according to claim 1 wherein generating a recommendation of a related data file item includes generating the recommendation of the related data file item further based on velocity or acceleration of a device.

9. The method according to claim 1 wherein generating a recommendation of a related data file item includes generating the recommendation of the related data file item further based on local lighting or illumination levels.

10. The method according to claim 1 wherein generating a recommendation of a related data file item includes generating the recommendation of the related data file item further based on local weather.

11. The method according to claim 1, wherein generating a recommendation of a related data file item includes generating the recommendation of the related data file item further based on an age of a user who supplied the user input data.

12. The method according to claim 1, wherein generating a recommendation of a related data file item includes generating the recommendation of the related data file item further based on a mood of a user who supplied the user input data, wherein the user input data further includes an indication of the mood of the user.

13. The method according to claim 1, wherein generating a recommendation of a related data file item includes generating the recommendation of the related data file item further based on a physical state of a user who supplied the user data input, wherein the user input data further includes an indication of the physical state of the user.

14. The method according to claim 1, wherein generating a recommendation of a related data file item includes generating a recommendation of a related data file item based on a desired year, wherein the input data includes an indication of the desired year.

* * * * *